United States Patent
Matsugi et al.

(10) Patent No.: US 9,408,345 B2
(45) Date of Patent: Aug. 9, 2016

(54) WORK VEHICLES

(71) Applicant: ISEKI & CO., LTD., Ehime-ken (JP)

(72) Inventors: Satoshi Matsugi, Ehime-ken (JP); Hirotaka Toda, Ehime-ken (JP)

(73) Assignee: ISEKI & CO., LTD., Ehime-Ken (JP)

( * ) Notice: Subject to any disclaimer, the term of this patent is extended or adjusted under 35 U.S.C. 154(b) by 96 days.

(21) Appl. No.: 14/316,725

(22) Filed: Jun. 26, 2014

(65) Prior Publication Data

US 2015/0000238 A1     Jan. 1, 2015

(30) Foreign Application Priority Data

Jun. 27, 2013   (JP) ................................. 2013-134417

(51) Int. Cl.
   *A01D 34/66*       (2006.01)
(52) U.S. Cl.
   CPC ..................... *A01D 34/661* (2013.01)
(58) Field of Classification Search
   CPC ....... A01D 34/54; A01D 34/64; A01D 34/66; A01D 34/74; A01D 67/04; A01D 67/00; A01D 67/005; A01D 34/661
   See application file for complete search history.

(56) References Cited

U.S. PATENT DOCUMENTS

| 5,865,020 | A | * | 2/1999 | Busboom | A01D 34/74 56/10.8 |
|---|---|---|---|---|---|
| 5,946,894 | A | * | 9/1999 | Eavenson | A01D 34/64 56/15.4 |
| 6,138,444 | A | * | 10/2000 | Torras, Sr. | A01D 34/64 56/14.7 |
| 2004/0000130 | A1 | * | 1/2004 | Bartel | A01D 34/69 56/11.3 |
| 2006/0070366 | A1 | * | 4/2006 | Laskowski | A01D 34/74 56/14.9 |
| 2006/0090442 | A1 | * | 5/2006 | Komiya | A01D 34/64 56/14.7 |
| 2006/0174601 | A1 | * | 8/2006 | Piontek | A01D 34/64 56/11.3 |
| 2008/0034723 | A1 | * | 2/2008 | Wright | A01D 34/74 56/17.1 |
| 2008/0184687 | A1 | * | 8/2008 | Scherbring | A01D 34/64 56/10.1 |
| 2008/0190084 | A1 | * | 8/2008 | Piontek | A01D 34/64 56/11.3 |

FOREIGN PATENT DOCUMENTS

JP        2012070696       4/2012

* cited by examiner

*Primary Examiner* — Robert Pezzuto
*Assistant Examiner* — Adam Behrens
(74) *Attorney, Agent, or Firm* — Finnegan, Henderson, Farabow, Garrett & Dunner LLP

(57) ABSTRACT

In a work vehicle, because of growing need to equip a DPF for exhaust gas countermeasures near an engine and a request of increasing the size of a fuel tank, a system including the fuel tanks provided below a floor step and on left and right sides of a transmission case has been employed. However, when a lawn mower is installed between front wheels and rear wheels, an increasing width of a vehicle body becomes a problem.
To solve the problem, a locus of the raising and lowering operation of a lawn mower 5 is specified by a parallel link formed of left and right front links 43, 43 and left and right mid links 45, 45, and in a work vehicle where the lawn mower 5 is freely raised and lowered, the left and right mid links 45, 45 are respectively disposed between a transmission case 3 and fuel tanks 16L, 16L.

2 Claims, 11 Drawing Sheets

WORK VEHICLES

CROSS REFERENCE TO RELATED APPLICATIONS

This application claims priority to Japanese Patent Application No. 2013-134417, filed Jun. 27, 2013, the disclosures of which is incorporated herein by reference in its entirety.

BACKGROUND

1. Technical Field

The present invention relates to a work vehicle, such as a tractor, driven by front wheels and rear wheels and including a work machine, such as a lawn mower, between the front wheels and the rear wheels.

2. Related Art

A work vehicle described in JP 2012-70696 A has a pair of front wheels and a pair of rear wheels on a body frame, and includes a lawn mower serving as a work machine between the front wheels and the rear wheels and below a floor step. In the lawn mower, raising and lowering operation is guided by a parallel link formed of a front link (a front link 43 in JP 2012-70696 A) and a mid link (a rear link 45 in JP 2012-70696 A). The lawn mower is raised and lowered with a hydraulic cylinder serving as a driving source.

Further, the work vehicle includes an engine at a front part. Power from the engine is transmitted to the rear wheels provided at the rear part or the work machine by a transmission within a transmission case (e.g., a front transmission case in JP 2012-70696 A) provided below the floor step.

In a work vehicle, because of growing need to equip a DPF (Diesel particulate filter) for exhaust gas countermeasures in a vicinity of an engine and a request of increase in size of a fuel tank, a system including the fuel tanks below a floor step and on left and right sides of a transmission case has been employed. However, in a case where a work machine, such as a lawn mower, is installed between front wheels and rear wheels, it is necessary that the fuel tank or peripheral equipment thereof should be installed to avoid interference with a parallel link serving as a guide for the work machine. There is a problem in that a width of a vehicle body becomes large. Therefore, a problem to be solved by the present invention is to provide a work vehicle solving the problem.

SUMMARY

In order to solve the above-described problem, a work vehicle in one aspect is provided with a transmission case (3) configured to be provided at a machine body; fuel tanks (16L, 16R) configured to be respectively provided on left and right sides with the transmission case (3) therebetween; a lawn mower (5) configured to be installed below the transmission case (3) and between front wheels (7, 7) and rear wheels (8, 8) for driving a vehicle body; and a parallel link formed of left and right front links (43, 43) disposed at a front part of the machine body and left and right mid links (45, 45) disposed at a central part of the machine body and configured to perform raising and lowering operation of the lawn mower (5), wherein the left and right mid links (45, 45) are respectively disposed between the transmission case (3) and the fuel tanks (16L, 16R).

Further, a second aspect of the present invention is the work vehicle according to the first aspect, wherein engagement parts (44, 44) between the mid links (45, 45) and the vehicle body are disposed above a communication pipe (17) communicating between the fuel tanks (16L, 16R).

Moreover, a third aspect of the present invention is the work vehicle according to the second aspect, wherein a bent part configured to bend downward is provided at the mid links (45, 45), and when the lawn mower (5) is moved to a lowered position, the mid links (45, 45) and the communication pipe (17) are not brought into contact with each other.

Additionally, a fourth aspect of the present invention is the work vehicle according to the third aspect, wherein height regulation stoppers (36, 36) configured to regulate a raising height of the lawn mower (5) are provided on outer sides of the engagement parts (44, 44).

According to the first aspect of the present invention, the mid links 45, 45 for guiding the raising and lowering operation of the lawn mower 5 are respectively disposed between the transmission case 3 and the fuel tanks 16L, 16R. Consequently, expansion of a vehicle body width due to the provision of the fuel tanks 16L, 16R can be prevented, and respective components of the transmission case 3, the fuel tanks 16L, 16R, and the parallel link including the mid links 45, 45 can be reasonably disposed in a vehicle width direction. Therefore, an overall vehicle body width can be narrowed.

According to the second aspect of the present invention, in addition to the effect of the invention described in the first aspect, the engagement parts 44, 44 between the mid links 45, 45 and the vehicle body are disposed above the communication pipe 17 communicating between the fuel tanks 16L, 16R. Consequently, while avoiding the contact of the communication pipe 17 installed at a relatively low part between the fuel tanks 16L, 16R and the vertically moving mid links 45, 45, respective components of the transmission case 3, the lawn mower 5, and the parallel link including the mid links 45, 45 can be reasonably disposed in a vehicle height direction. Therefore, an overall vehicle height can be lowered.

According to the third aspect of the present invention, in addition to the effect of the invention described in the second aspect, the bent part configured to bend downward is provided at the mid links 45, 45. When the lawn mower 5 is moved to the lowered position, the mid links 45, 45 and the communication pipe 17 are not brought into contact with each other. Consequently, while a raising and lowering operation stroke needed by the lawn mower 5 is secured, a raising height of the lawn mower 5 can be secured to the maximum. Also, since the bent part is detoured above the communication pipe 17, a front and rear length of the mid link 45 can be shortened, and it is not necessary to increase an overall length of the work vehicle because of the mid link 45. According to the fourth aspect of the present invention, in addition to the effect of the invention described in the third aspect, by providing the height regulation stoppers 36, 36, the contact of the fuel tanks 16L, 16R and the lawn mower 5 can be prevented. Further, by providing the height regulation stopper 36 on the outer side of the engagement part 44, a length between the height regulation stoppers 36, 36 can be increased. Accordingly, when the lawn mower 5 is brought into contact with the one height regulation stopper 36, left and right balance is not lost, and it is possible to perform stable operation. Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

Reference will now be made to the accompanying drawings which illustrate exemplary embodiments of the present disclosure. In the drawings.

DESCRIPTION OF EXEMPLARY EMBODIMENTS

Reference will now be made in detail to several exemplary embodiments of the present disclosure, including those illustrated in the accompanying drawings. Whenever possible, the same reference numbers will be used throughout the drawings to refer to the same or like parts.

Figure 1:
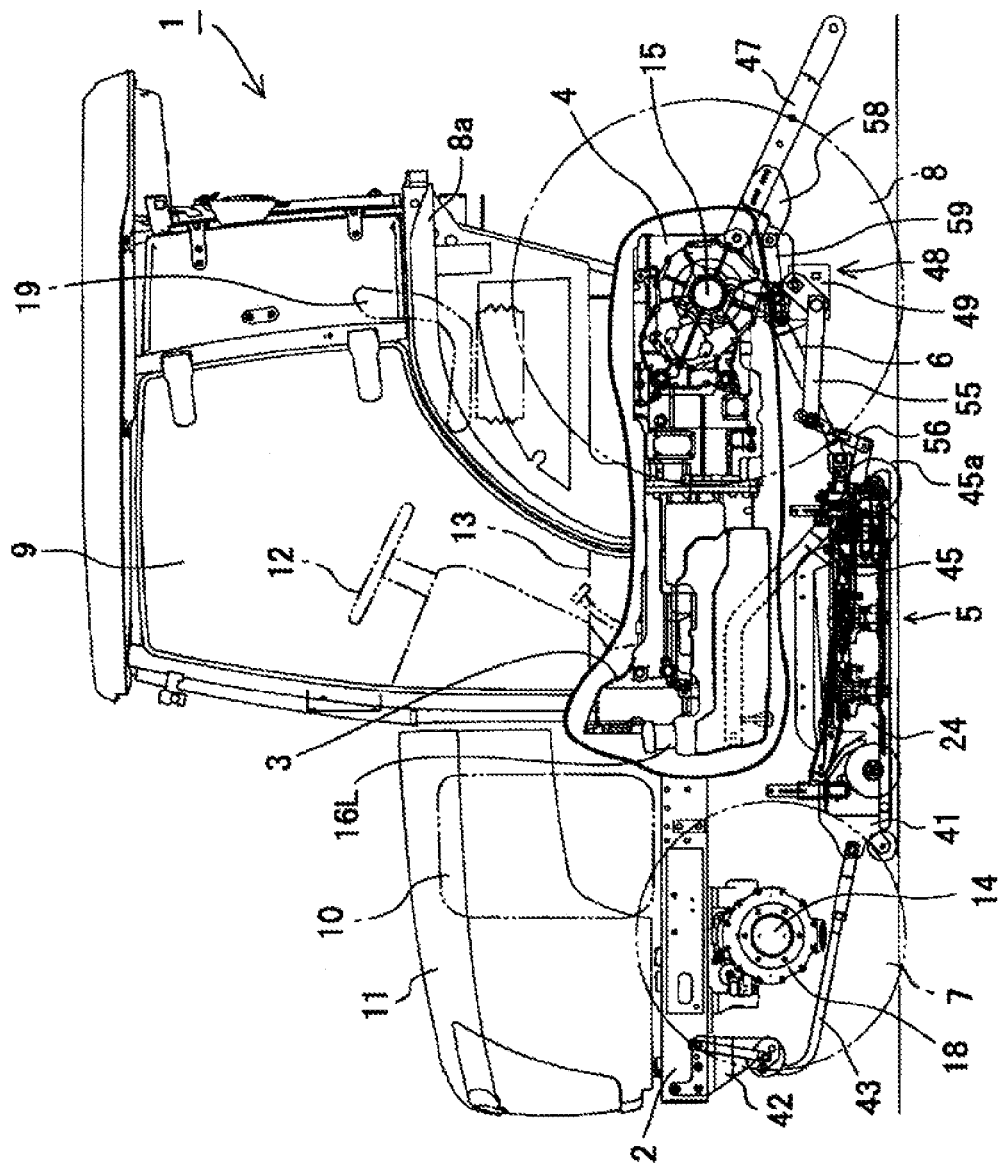
FIG. 1 is a side view of a work vehicle according to the first embodiment of the present invention.
Figure 2:
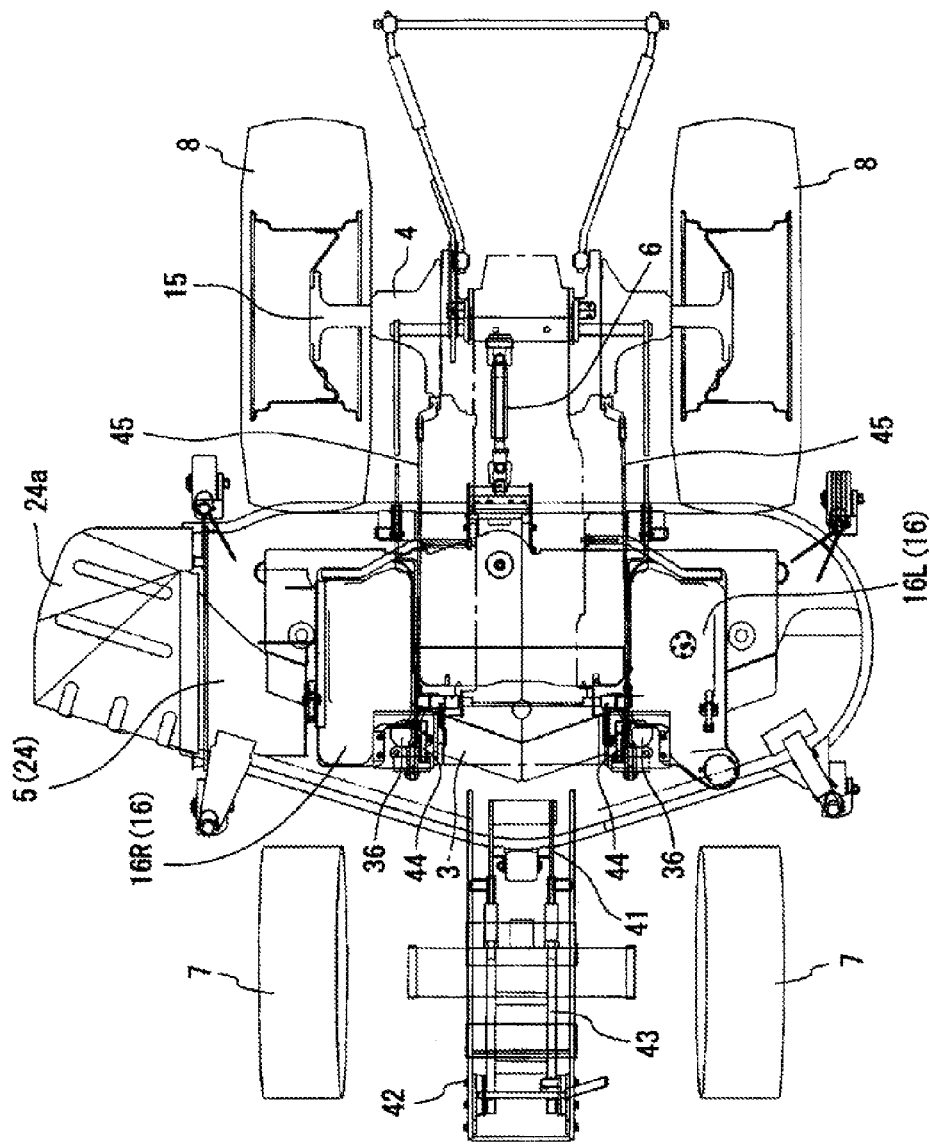
FIG. 2 is a plan view of a periphery of a lawn mower of the work vehicle in FIG. 1.
Figure 3:
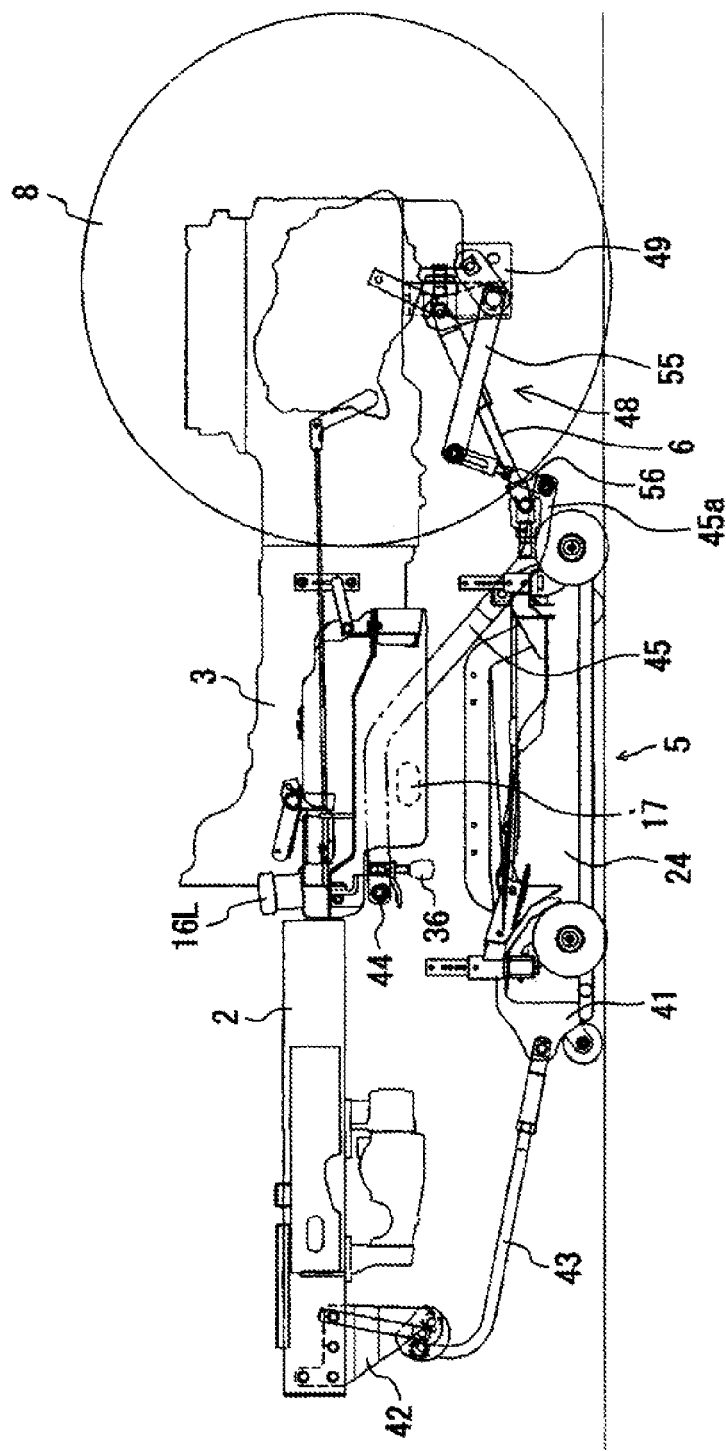
FIG. 3 is a side view of the periphery of the lawn mower of the work vehicle in FIG. 1.
Figure 4:
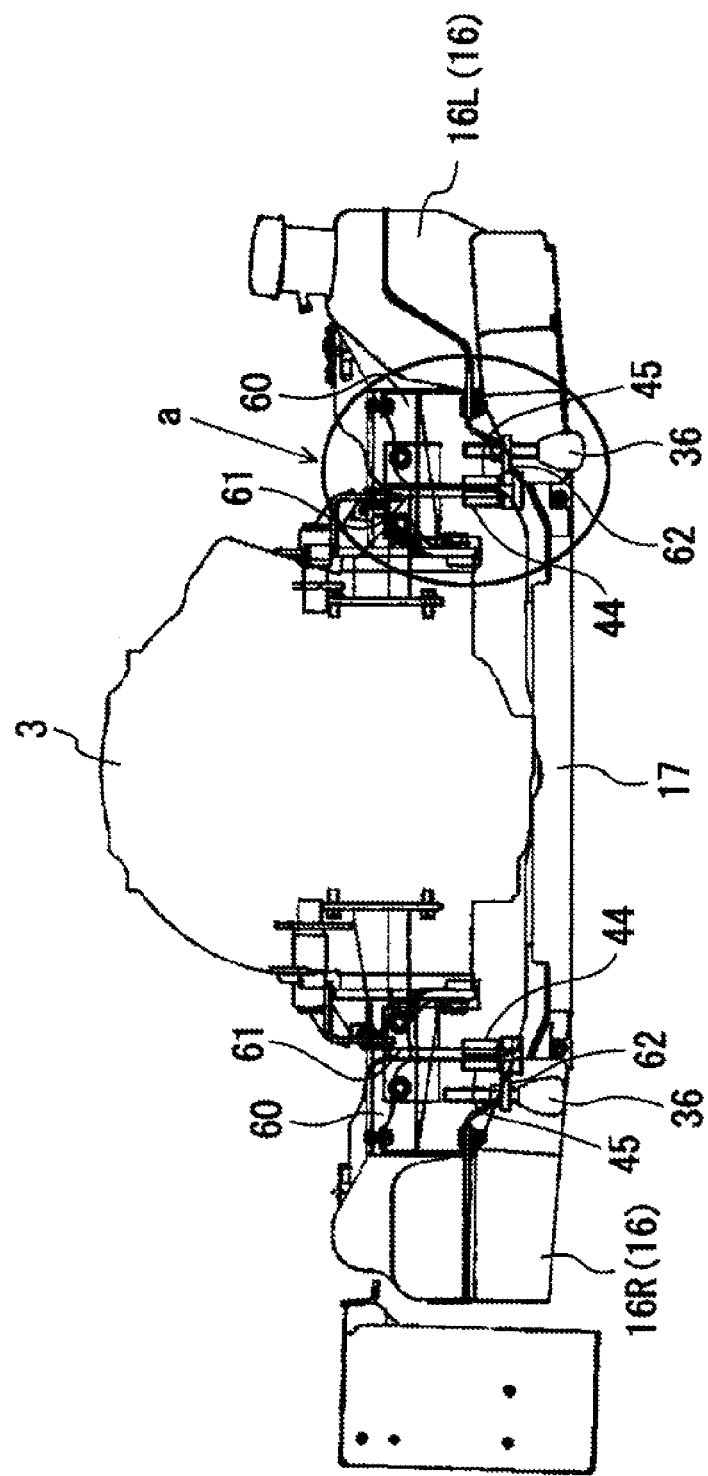
FIG. 4 is a front view of the periphery of the lawn mower of the work vehicle in FIG. 1.
Figure 6:
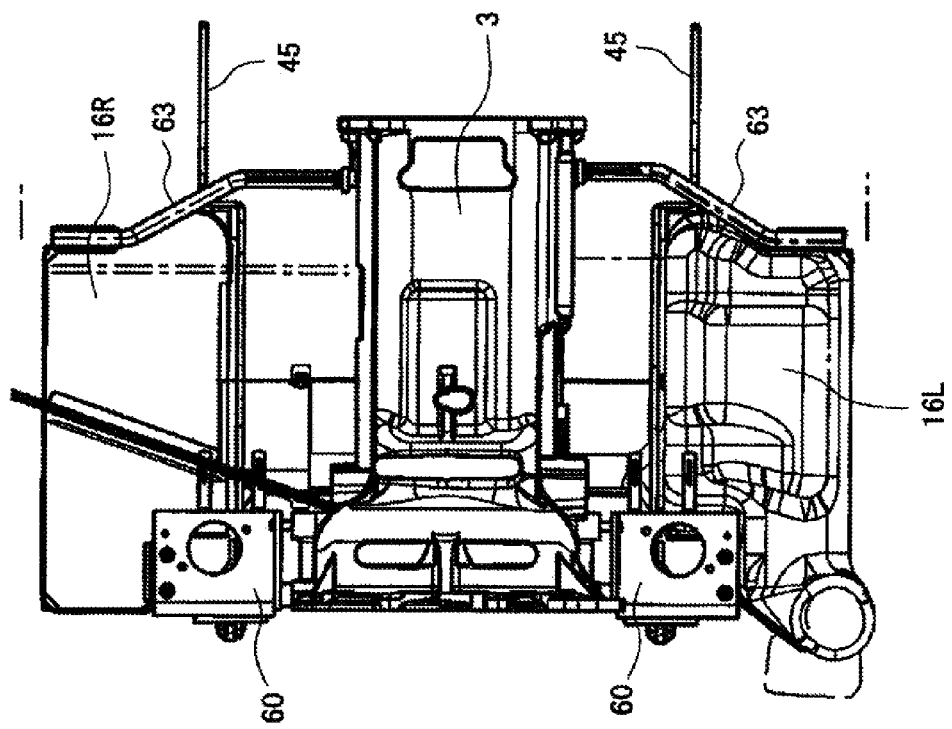
FIG. 6 is a plan view of a periphery of fuel tanks of the work vehicle in FIG. 1.
Figure 7:
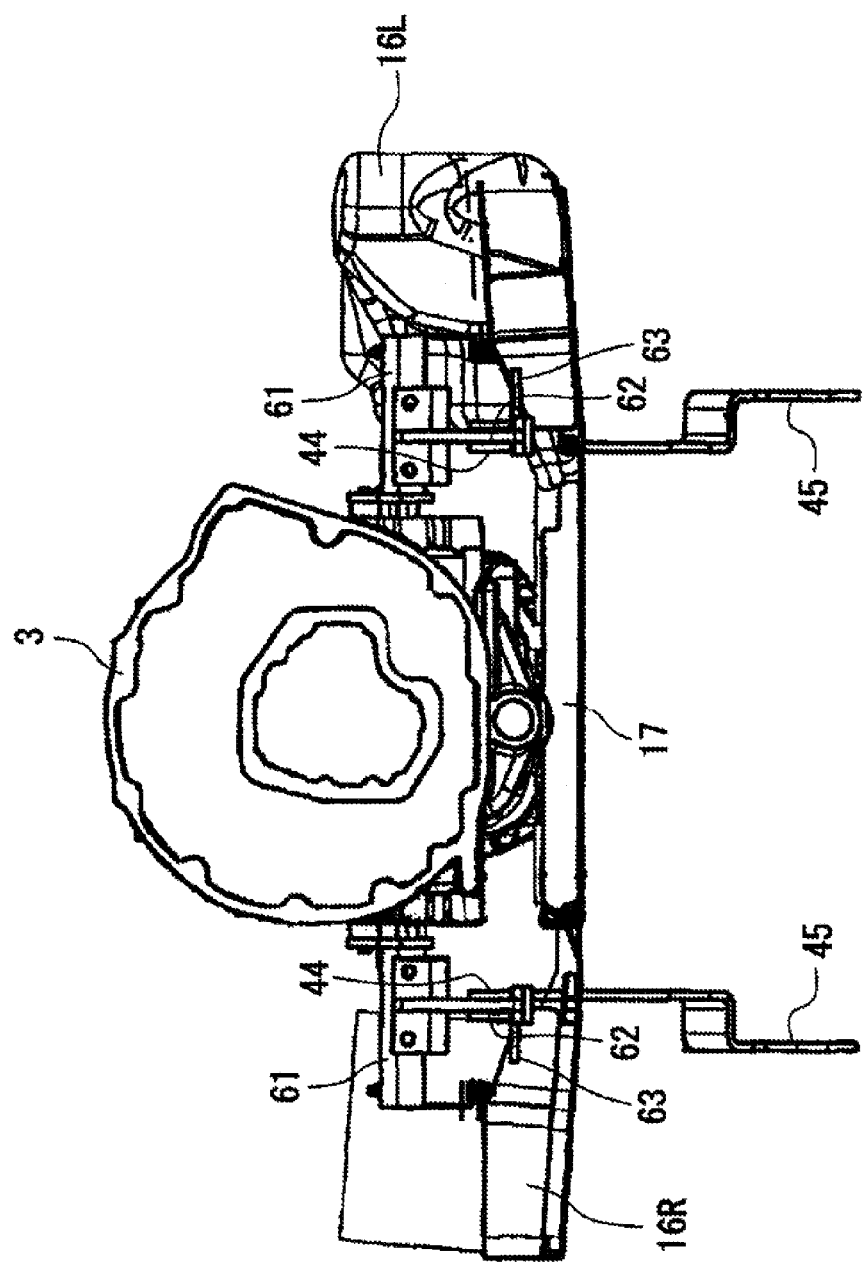
FIG. 7 is a front view of the periphery of the fuel tanks of the work vehicle in FIG. 1.
Figure 8:
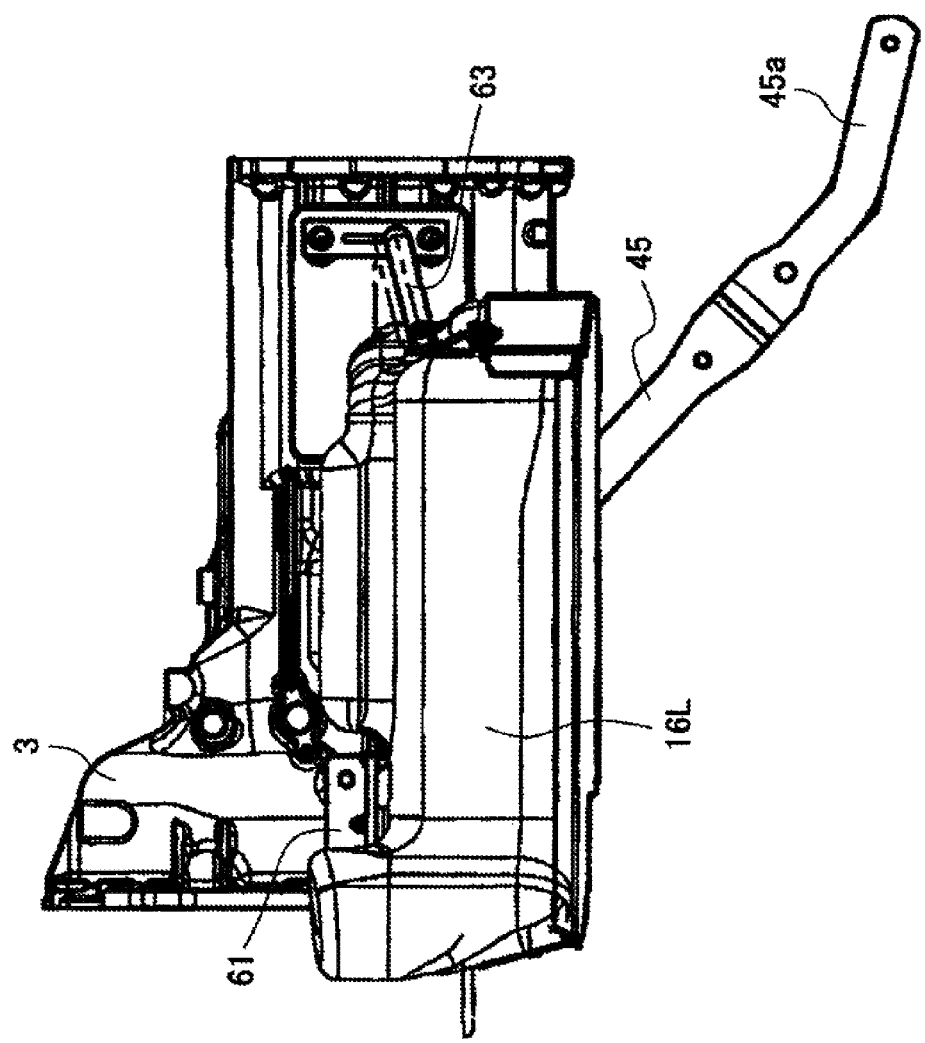
FIG. 8 is a side view of the periphery of the fuel tanks of the work vehicle in FIG. 1.
Figure 9:
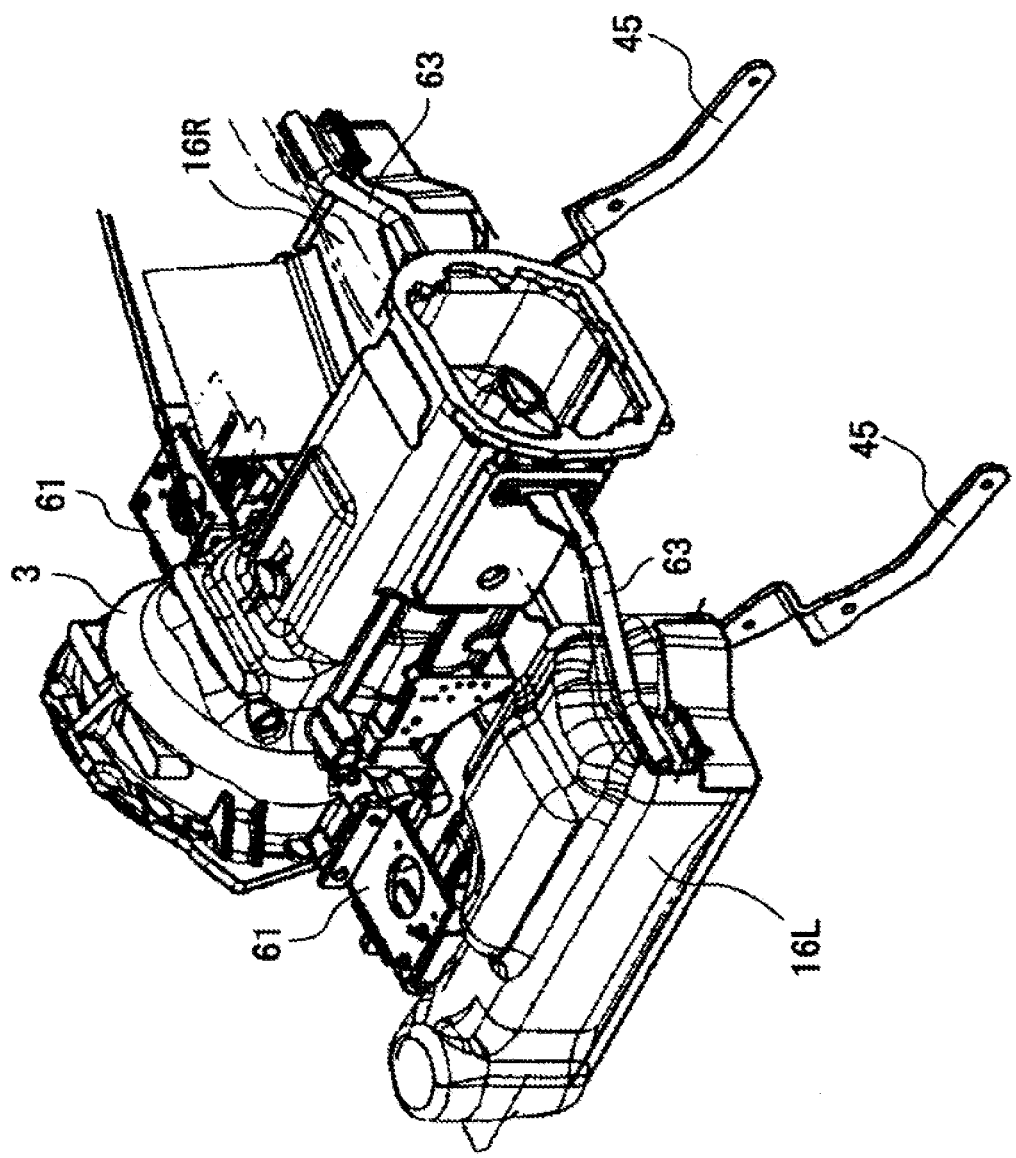
FIG. 9 is a perspective view of the periphery of the fuel tanks of the work vehicle in FIG. 1.

A description will hereinafter be given of embodiments of the present invention in conjunction with drawings. It should be noted that in the present specification, left and right in an advancing direction of a vehicle, on which an operator rides, is respectively referred to as "left" and "right" and that front and rear therein is respectively referred to as "front" and "rear". FIG. 1 illustrates a right side view of a tractor serving as a work vehicle according to a first embodiment of the present invention. In the drawing, a cloud-shaped portion perspectively illustrates peripheral members of a lawn mower according to the embodiment of the present invention. FIG. 2 illustrates a plan view of a periphery of a lawn mower 5 of the work vehicle in FIG. 1, FIG. 3 illustrates a right side view thereof, and FIG. 4 illustrates a front view thereof. Further, FIG. 6 illustrates a plan view of a periphery of fuel tanks 16L, 16R of the work vehicle in FIG. 1, FIG. 7 illustrates a front view thereof, FIG. 8 illustrates a side view thereof, and FIG. 9 illustrates a perspective view thereof.

In the work vehicle according to the embodiment of the present invention, power of an engine 10 mounted within a hood 11 of a vehicle body front part is appropriately subjected to speed change by a speed change device within a transmission case 3. The power is transmitted to a front wheel shaft 14 and a rear wheel shaft 15, and drives both a wheel type front wheel 7 and a wheel type rear wheel 8 or only the rear wheel 8. A rear wheel fender 8a for preventing mud from scattering from the rear wheels 8, 8 is arranged above each of the rear wheels 8, 8 of the work vehicle. In the work vehicle, the engine 10 is mounted to a front part through a body frame 2 supported by a front axle housing 18, and a clutch housing, the transmission case 3, and the like are integrally coupled to a rear side of the engine 10. A rear axle housing 4 is provided at a rearmost part of the transmission case 3, thereby axially attaching the rear wheel 8 to both left and right side parts.

A cabin 9 including a floor step 13 is mounted on the body frame 2 of the vehicle. An operator sitting in a driver's seat 19 provided within the cabin 9 operates an operation handle, such as a steering wheel 12, erected at a center and travels while steering the front wheel 7. Also, various types of operation levers and the like for operating and controlling the work vehicle are provided on a side of the driver's seat 19. The transmission case 3 is provided below the floor step 13, and resin fuel tanks 16L, 16R are respectively provided on left and right sides with the transmission case 3 therebetween. A communication pipe 17 for communicating the two fuel tanks 16L, 16R is provided at a lower part of the fuel tanks 16L, 16R in such a way that the both fuel is consumed equally. Further, a hose connects the fuel tanks 16L, 16R and the engine 10, and a pump for supplying the fuel from the fuel tanks 16L, 16R to the engine 10 is disposed. Accordingly, the fuel from the fuel tanks 16L, 16R provided below the engine 10 is supplied stably.

In the work vehicle according to the embodiment of the present invention, the lawn mower 5 serving as a work machine is installed below the transmission case 3 and between front and rear of the left and right front wheels 7, 7 and the left and right rear wheels 8, 8. The lawn mower 5 is raised and lowered when the operator operates a raising and lowering lever in the driver's seat 19, and the power branched from the transmission within the transmission case 3 is transmitted to a PTO shaft 6. The PTO shaft 6 transmits the power to a mower deck 24 of the mower 5 through a universal joint, and lawn mowing is performed by driving a reaping blade within the lawn mower 5.

A support mechanism of the lawn mower 5 will be described. As illustrated in FIG. 1, a pair of left and right front links 43, 43 is rotatably provided between a front support plate 41 provided at a front end part of the mower deck 24 and a support plate 42 provided at a front end part of the body frame 2 in a suspended state.

On the other hand, a pair of left and right mid links 45, 45 is rotatably provided between a rear end part of the lawn mower 5 and engagement parts 44, 44 provided at a front and rear intermediate part of the body frame 2. A parallel link is constituted of the front link 43 and the mid link 45. By constituting in this way, a locus of the raising and lowering operation of the lawn mower 5 can be specified while maintaining a posture of the lawn mower 5.

In the work vehicle according to the embodiment of the present invention, the mid links 45, 45 are respectively disposed between the transmission case 3 and the fuel tanks 16R, 16L in a plan view. Further, the engagement parts 44, 44 between the mid links 45, 45 and the body frame 2 are configured so as to be positioned above the communication pipe 17 communicating between the fuel tanks 16L, 16R. Moreover, the mid link 45 has a bent part bending downward and a shape including a "dogleg-shaped" portion in a side view. Additionally, even if the lawn mower 5 is moved to a lowered position, the mid links 45, 45 and the communication pipe 17 are not brought into contact with each other.

The mid links 45, 45 for guiding the raising and lowering operation of the lawn mower 5 are respectively disposed between the transmission case 3 and the fuel tanks 16L, 16R.

In other words, the mid links 45, 45 are provided at narrow space parts between the transmission case 3 and the fuel tanks 16L, 16R existing in the conventional configuration. Accordingly, expansion of a vehicle body width can be prevented, and respective components of the transmission case 3, the fuel tanks 16L, 16R, and the parallel link including the mid links 45, 45 can be reasonably disposed in a vehicle width direction. Therefore, an increase in the overall vehicle body width can be prevented.

The engagement parts 44, 44 between the mid links 45, 45 and the vehicle body are disposed above the communication pipe 17 communicating between the fuel tanks 16L, 16R. Accordingly, while avoiding the contact of the communication pipe 17 installed at a relatively low part between the fuel tanks 16L, 16R and the vertically moving mid links 45, 45, respective components of the transmission case 3, the lawn mower 5, and the parallel link including the mid links 45, 45 can be reasonably disposed in a vehicle height direction. Therefore, an overall vehicle height can be lowered.

The bent part bending downward is provided at the mid links 45, 45. When the lawn mower 5 is moved to a raised position, the mid links 45, 45 and the communication pipe 17 are not brought into contact with each other. Accordingly, while a raising and lowering operation stroke needed by the lawn mower 5 is secured, a raising height of the lawn mower 5 can be secured to the maximum. Additionally, the bent part bending downward is formed at the mid links 45, 45 and connects the mid links 45, 45 and the lawn mower 5. Therefore, a front and rear length of the mid link 45 can be shortened, and there is no need to increase an overall length of the work vehicle because of the mid link 45.

Next, description will be given of a lawn mower raising and lowering linkage mechanism 48 serving as a raising and lowering mechanism of the lawn mower 5. A lower end of the one mid link 45 (left side in the present embodiment) of the left and right mid links 45, 45 is extended, and the lawn mower raising and lowering link mechanism 48 is configured between an extension part 45a and a lower link 47 provided at a rear part of the work vehicle. The lower link 47 is rotated upward and downward by a hydraulic cylinder (not illustrated) by operating a raising and lowering operation lever at hand.

The above-described lawn mower raising and lowering linkage mechanism 48 is constituted of a hanging rod 56, an intermediate link 55, a traction rod 59, and a bracket 58. The hanging rod 56 is provided between the extension part 45a of the above mid link 45 and the intermediate link 55, and is rotatably coupled with these members. The intermediate link 55 is "dog-leg" shaped, and a "dog-shaped" bent part is rotatably coupled to a bracket 49 suspended from the body frame 2 so as to bend upward. The intermediate link 55 is also coupled rotatably to the traction rod 59. The traction rod 59 is rotatably coupled to the bracket 58 also used for reinforcement.

With the above-described configuration, when the lawn mower 5 is raised from a working position where mowing operation is performed to a non-working position where the lawn mower 5 is in a stored state, the operator operates the raising and lowering operation lever to a raising side and rotates to raise the lower link 47. Accordingly, by the lawn mower raising and lowering linkage mechanism 48, the interlocking mid link 45 is rotated around the engagement part 44, and the lawn mower 5 is raised while holding its posture. Further, when the lawn mower 5 is lowered from the non-working position to the working position, the operator operates the raising and lowering operation lever to a lowering side and rotates to lower the lower link 47. Consequently, the lawn mower 5 is lowered by the lawn mower raising and lowering linkage mechanism 48.

Figure 10:
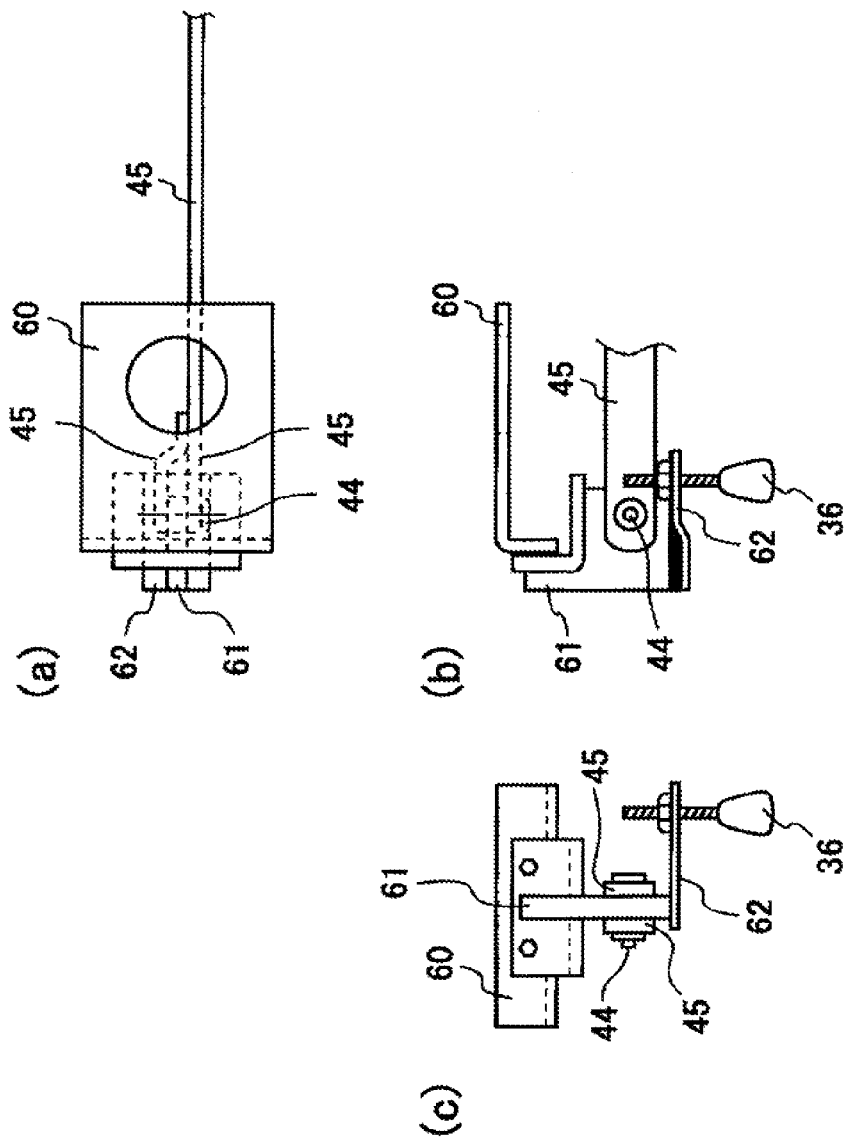
FIGS. 10A to 10C are explanatory diagrams of a periphery of an engagement part of the work vehicle in FIG. 1.

In addition to FIGS. 1 to 9, a periphery of the engagement part 44 between the mid link 45 and the vehicle body will be described referring to FIGS. 10A to 10C. FIGS. 10A to 10C are enlarged views of an "a" part in FIG. 4, i.e., the periphery of the engagement part 44 on a vehicle body left side. FIG. 10A is a plan view of the "a" part, FIG. 10B is a right side view thereof, and FIG. 10C is a front view thereof.

In the work vehicle according to the embodiment of the present invention, left and right side beams 60, 60 extending outward are coupled to a front side surface of the transmission case 3. A vertical bracket 61 suspended downward is provided at the side beam 60, and further, a stopper supporter 62 for fixing a height regulation stopper 36 is provided at a lower end of the vertical bracket 61. A front part of the mid link 45 is fixed by welding two steel plates at a predetermined interval in a left and right direction. The vertical bracket 61 is sandwiched by the two plates, and a shaft protruding from a side surface of the vertical bracket 61 is fitted into a hole of the mid link 45. Accordingly, the mid link 45 is freely rotated around the engagement part 44 with respect to the vehicle body. In a case where the mid link 45 is rotated downward, the mid link 45 and the stopper supporter 62 are brought into contact with each other before the mid link 45 is brought into contact with the communication pipe 17. Further, a mount rubber is mounted to a hole provided at an upper part of the side beam 60, and the cabin 9 is provided thereat. A fuel tank support member for providing the fuel tank 16 is fixed by the side beam 60 and a rear side beam 63 provided at a rear side surface of the transmission case 3.

In the work vehicle according to the embodiment of the present invention, each of the height regulation stoppers 36, 36 regulating the raising height of the lawn mower 5 serving as the work machine is provided at the stopper supporter 62. The height regulation stopper 36 has a structure in which soft rubber is provided at a lower end of a male screw. The height regulation stopper 36 is installed at the stopper supporter 62 symmetrically provided at each of the side beams 60, 60 configuring the body frame 2. Describing in detail, the left and right height regulation stoppers 36, 36 are disposed on rear sides of foremost parts of the fuel tanks 16L, 16R, and on further inner sides of inner inward surfaces of the left and right fuel tanks 16L, 16R opposing to each other. In the present embodiment, an "inward surface" means a surface facing a left and right center of a plurality of outer peripheral surfaces held by the fuel tanks 16L, 16R. The "inward surface" includes not only a surface that is closest to the left and right center of the surfaces facing the left and right center, but also a surface facing the left and right center while forming a recessed part provided at the front parts of the fuel tanks 16L, 16R. Further, the left and right height regulation stoppers 36, 36 are provided on outer sides of the engagement parts 44, 44 serving as rotation coupling parts between the body frame 2 and the mid links 45, 45.

By providing the height regulation stoppers 36, 36, the contact of the fuel tanks 16L, 16R and the lawn mower 5 can be prevented. Further, by disposing the height regulation stoppers 36, 36 on the rear sides of the foremost parts of the fuel tanks 16L, 16R, and on the further inner sides of the inward surfaces of the fuel tanks 16L, 16R, a space part can be effectively utilized. Moreover, since the circumference is protected, a regulating height position of the height regulation stopper 36 is not changed due to age-related deterioration or the like, and the contact can be prevented more reliably.

By providing the height regulation stoppers 36, 36 on the outer sides of the engagement parts 44, 44, a length between the height regulation stoppers 36, 36 can be increased. Accordingly, when the lawn mower 5 is brought into contact with the one height regulation stopper 36, left and right balance is not lost, and it is possible to perform stable operation.

Figure 5:
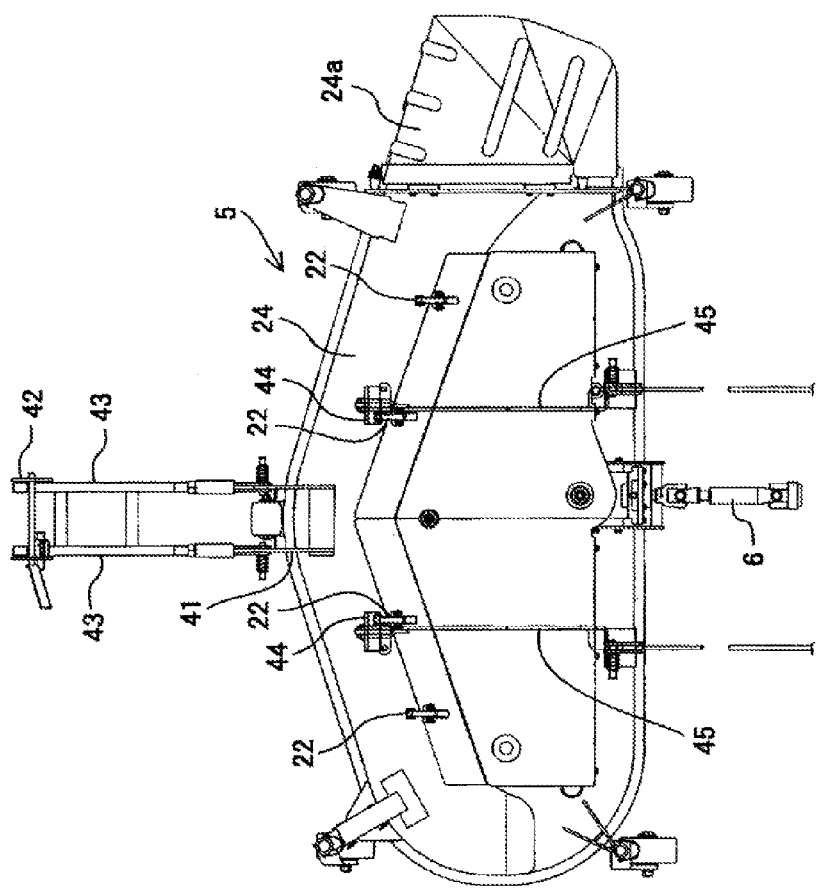
FIG. 5 is a plan view of the lawn mower of the work vehicle in FIG. 1.

FIG. 5 illustrates a plan view of the lawn mower 5 of the work vehicle in the embodiment of the present invention. An inner configuration of the lawn mower 5 is the same as the one illustrated in JP 2012-70696 A. The lawn mower 5 has three reaping blades, and each reaping blade is rotated around a vertical rotational shaft. The power from the PTO shaft 6 is used to rotate each reaping blade through a transmission belt. The reaped lawn is discharged from a discharge port 24a. A cover of the lawn mower 5 is fixed to the lawn mower 5 body by four hooks 22. The four hooks 22 are provided at positions which are not brought into contact with the fuel tanks 16L, 16R located above. Specifically, the hooks 22 are provided so as to be positioned on both sides with the fuel tanks 16L, 16R therebetween. By providing in this way, the raising and lowering stroke of the lawn mower 5 can be large.

Figure 11:
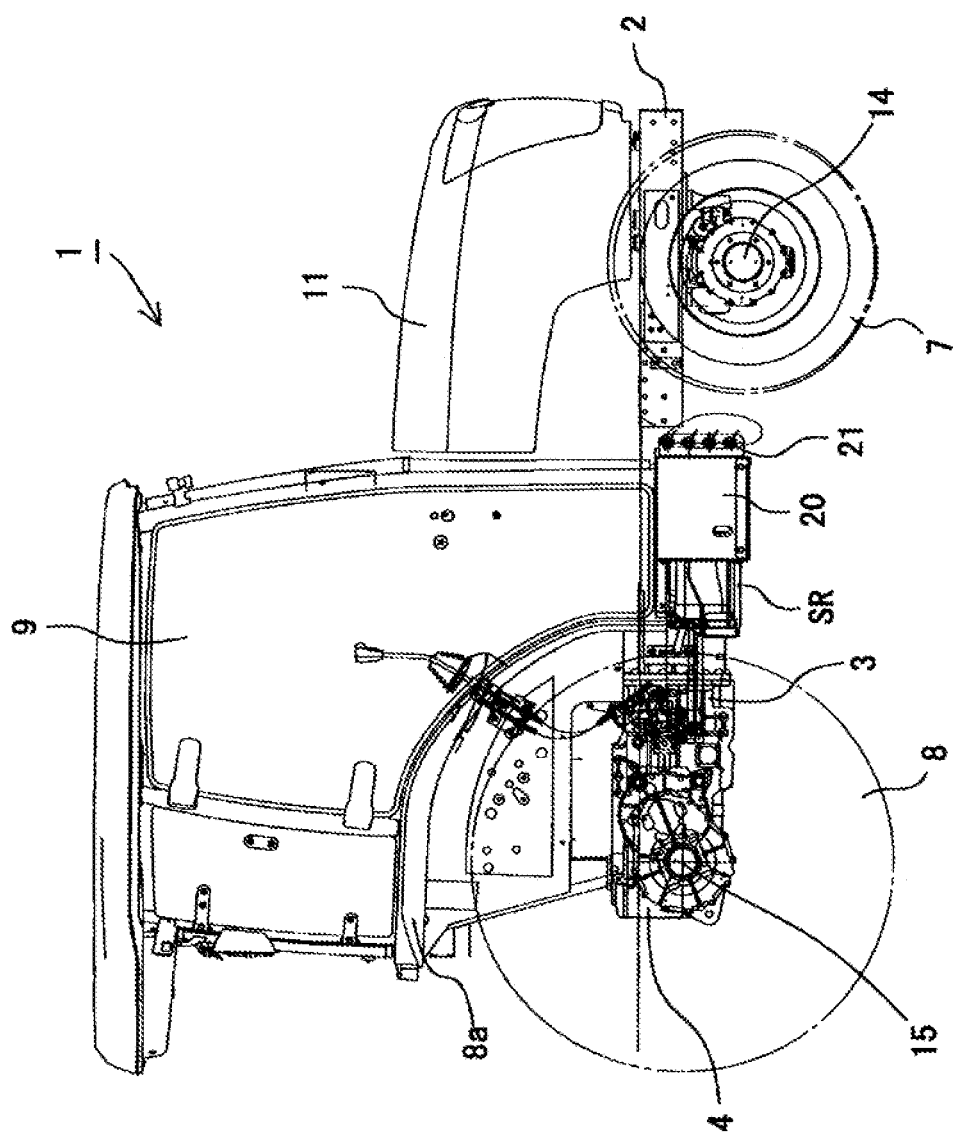
FIG. 11 is a side view of a work vehicle according to a second embodiment.

FIG. 11 illustrates a left side view of a work vehicle according to a second embodiment. A loader can be mounted to a vehicle front of the work vehicle as a work machine. Raising and lowering and a posture of the loader are controlled by hydraulic pressure from the work vehicle. In the work vehicle of the second embodiment, a front manifold for providing the hydraulic pressure to the loader is disposed on a right side surface of the vehicle body. Specifically, the front manifold is constituted of a cover body 20, and four pipe joints are provided at a front part of the cover body 20. Pipe joints 21, 21 supply operation oil at the time of raising and lowering of the loader, and pipe joints 21, 21 supply operation oil when a posture of a bucket of the loader is inclined forward or inclined rearward. Further, the above-described cover body 20 is configured to cover a fuel filter. The fuel filter is normally disposed within an engine room in a hood 11, or directly mounted to an engine 10. However, in a case where a DPF is disposed within the engine room, it is necessary to move the fuel filter to a separate place. Therefore, in the present case, the fuel filter is mounted to a front part of a right step SR for getting on/off a cabin 9, and the fuel filter is covered with the cover.

At this time, in the same way as the mid link 45, a piping of a hydraulic hose from a hydraulic pump (not illustrated) located on a rear side of a transmission case 3 to the four pipe joints 21 is arranged between the transmission case 3 and the right fuel tank 16R so as to pass through above a communication pipe 17. By arranging in this way, even in a case where the lawn mower 5 is raised to a non-working position, the hydraulic hose is not sandwiched between the lawn mower 5 and the fuel tank 16R. Further, in a case where height regulation stoppers 36, 36 are provided on outer sides of engagement parts 44, 44, interference with these hydraulic hoses can be reduced.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A work vehicle comprising:
a transmission case provided below a floor step;
fuel tanks provided on a left side and a right side of the transmission case;
a lawn mower provided below the transmission case and between front wheels and rear wheels for driving a machine body; and
a parallel link including a pair of front links and a pair of mid links, the parallel link defining a raising and lowering track of the lawn mower, the parallel link and a lower link configured to perform a raising and lowering operation of the lawn mower, wherein each of the mid links are disposed respectively between the transmission case and each of the fuel tanks,
wherein the mid links have engagement parts engaged with the machine body, the engagement parts being disposed above a communication pipe communicating between the fuel tanks,
wherein the mid links have a bent part bending downward, and when the lawn mower is moved to a lowered position, the mid links and the communication pipe are not brought into contact with each other,
wherein height regulation stoppers are provided at a location outside of the engagement parts, the height regulation stoppers being configured to regulate a raising height of the lawn mower,
left and right side beams extending outward and being coupled to a front side surface of the transmission case, each of the side beams having a vertical bracket suspended downward, a stopper supporter provided at a lower end of the vertical bracket, and a height regulation stopper, and
wherein the vertical bracket has an engagement part around which a corresponding mid link rotates, the corresponding mid link and the stopper supporter being configured to contact with each other and prevent the corresponding mid link from contacting with the communication pipe when the corresponding mid link is rotated downward.

2. The work vehicle of claim 1, wherein each of the side beams is provided with a hole at an upper part thereof, a mount rubber mounted to the hole, and a cabin provided at the mount rubber.

* * * * *